United States Patent [19]

Davis

[11] Patent Number: 4,612,224

[45] Date of Patent: Sep. 16, 1986

[54] FIBER WEB FOR COMPRESSION MOLDING STRUCTURAL SUBSTRATES FOR PANELS

[75] Inventor: Alfred L. Davis, Thomson, Ga.

[73] Assignee: Sheller-Globe Corporation, Toledo, Ohio

[21] Appl. No.: 803,282

[22] Filed: Dec. 2, 1985

[51] Int. Cl.[4] ............................................. B32B 5/12
[52] U.S. Cl. ................................ 428/109; 428/283; 428/284; 428/300; 428/402
[58] Field of Search ............... 428/109, 110, 283, 284, 428/300, 402

[56] References Cited

U.S. PATENT DOCUMENTS

| | | | |
|---|---|---|---|
| 2,483,405 | 10/1949 | Francis | 428/296 |
| 3,629,048 | 12/1971 | Davison | 428/110 |
| 3,924,040 | 12/1975 | Addie et al. | 428/300 |
| 3,935,046 | 1/1976 | Kurnan et al. | 428/300 |
| 4,146,564 | 3/1979 | Garrick et al. | 264/113 |
| 4,418,031 | 11/1983 | Doerer et al. | 428/288 |
| 4,474,846 | 10/1984 | Doerer et al. | 428/288 |

Primary Examiner—James J. Bell
Attorney, Agent, or Firm—Cullen, Sloman, Cantor, Grauer, Scott and Rutherford

[57] ABSTRACT

A fibrous web useful for compression molding stiff, board-like structural substrates for panels is formed of a thoroughly intermixed blend of wood fibers and synthetic plastic fibers with a dry, powdery, resinous molding material uniformly disbursed throughout the blend. The mass of intermixed fibers and resinous molding material is covered with a thin, randomly oriented, fibrous scrim material and the fibers are locked to each other and to the scrim mechanically by means of needling them together. The web is formed by drying wood fibers, spreading them into a mat, covering the mat with the synthetic fibers and thereafter, dispersing the fibers through a dispersion chamber and re-collecting and re-spreading them into a web by means of a picker roller, gravity dropping a powdery resinous molding material upon the web, redistributing and intermixing the fibers and the molding material with a second picker roller, applying the scrim and needling the combined scrim and fiber web for mechanically interlocking them.

5 Claims, 7 Drawing Figures

FIBER WEB FOR COMPRESSION MOLDING STRUCTURAL SUBSTRATES FOR PANELS

BACKGROUND OF INVENTION

Structural substrates for panels are generally formed of compression molded fibrous webs which are cut and molded into the shape required. Such substrates are used to back up interior paneling members, such as door panels and the like within automobiles and for other analogous uses. In the current methods of manufacturing the web material, which is later cut and compression molded, it is conventional to mix together fibers of wood and synthetic plastic which are distributed, by means of conveyor belts and suitable distribution rollers, and the like into non-woven fiber mats. A powdery, synthetic resin molding compound is applied to such mats. The mats are then heated to partially cure the molding compound. This gives the resulting web sufficient structural integrity so that it may be picked up, handled, moved about and positioned within mold cavities. Since the resinous material is only partially cured, a substantial portion of it remains uncured. That uncured portion is cured during the compression molding process by the application of heat and pressure to the material while it is contained within a cavity type of mold.

In the foregoing procedure, the partially cured resinous molding powder tends to form a skin-like crust on the surfaces of the web as well as relatively hard portions within the web so that the web resists easy flexing. Consequently, the web is more difficult to drape within the mold cavity around irregular mold areas, especially those areas which have relatively sharp corners or straight or undercut walls and the like. In addition, such materials are difficult to deep draw because of their relative stiffness and resistance to draping.

Moreover, in such prior procedure, since the resinous material used is partially cured before the molding process, in order to have sufficient molding material available during the compression molding, larger amounts of molding material are needed. Alternatively, the finished substrate has less cured molding material than is desirable.

Thus, there has been a need for a fiber web material which is more pliable and easily drapable within a mold so as to produce sharper corners and better undercut or straight wall areas and which carries a maximum amount, within desired limits, of uncured molding material. The invention herein is concerned with such a web and a method of forming it, which results in a more pliable, drapable, web that can be more deeply and easily drawn in a compression molding operation.

SUMMARY OF INVENTION

This invention relates to a web used in compression molding of structural substrates formed of non-woven randomly oriented blended fibers. The web contains uniformly dispersed dry, completely uncured, resinous molding powder. The fibers are mechanically interlocked to each other and to a non-woven fiber scrim sheet covering at least one face of the web.

The web is formed by successive fiber blending steps in which the fibers are successively spread out into mats which are taken apart and reblended until a final step where the fibrous web, now containing uniformly dispersed dry molding powder, is mechanically locked to a scrim sheet by needling. At that point, the finished web, containing uncured molding powder, has structural integrity, for easy handling, and good pliability or extensibility for easy draping within a compression mold cavity.

The fiber blend is made of a mixture of wood fibers and synthetic plastic fibers, such as nylon, polyester or polypropylene or the like. The percentages of each of the fibers within the blend may be varied depending upon the requirements, costs, etc. For certain applications, it is contemplated to utilize blends of only synthetic fibers, but preferably of different kinds of synthetic plastics.

An important object of this invention is to provide a compression moldable web which has sufficient structural integrity and pliability or flexibility to enable deep drawing of the web in the mold, good draping over irregular mold surfaces, particularly over relatively sharp corners and undercuts. Another important object is to produce a web without the necessity of partial curing of molding powder so that 100% of the molding powder is available for the compression molding. Significantly, the crust or other stiffened resinous areas resulting from pre-curing are eliminated.

Another object of this invention is to eliminate the pre-curing or partial curing of the resinous molding powder web so as to enhance the extensibility of the fiber web during the molding procedure. This produces a more uniform density finished molded substrate without weak points that have occurred in the past due to varying densities or thicknesses of a web stretched within a compression mold cavity.

These and other objects and advantages of this invention will become apparent upon reading the following description of which the attached drawings form a part.

DETAILED DESCRIPTION

Figure 1A:
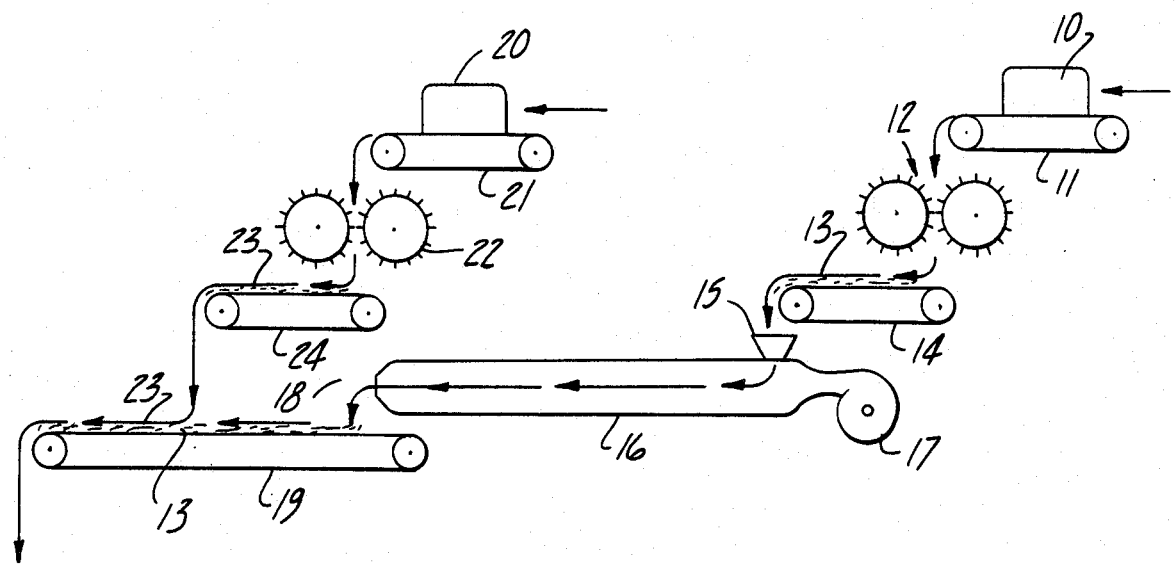
FIG. 1A is a schematic elevational view of the beginning portion of the equipment.

Referring to FIG. 1, a bale of wood fibers enters the line of equipment upon a conveyor 11. The wood fibers, for example, may form a bale which is approximately 12 inches × 12 inches × 36 inches, weighing about 60 lbs. and having a moisture content of up to about 20% by weight. The wood is preferably of what is called a soft-hardwood, for example, wood of the aspen family, including yellow poplar, and similar such woods which are commercially available in fiber form.

The bale 10 proceeds into a bale breaker and shredder 12 which is schematically shown. This breaks up and shreds the bale into loose fibers 13 which are deposited upon a removal conveyor 14.

The fibers 13 are deposited into a feed hopper 15 of a dryer 16. Although different commercially available dryers may be used, a preferred dryer is a commercially available, tubular, forced air dryer having a hot air blower 17 which blows air through a long tube. The tube may be over 100 feet in length. The flowing air picks up the fibers entering through the feed hopper and carries them to the discharge orifice 18 of the dryer. This type of dryer is rapid acting and may carry the fibers through, drying them sufficiently to provide optimum molding conditions, such as to 5%, and preferably, to about 3% moisture by weight, in less than a minute.

The fibers exiting from the discharge orifice 18 of the dryer are carried away upon a conveyor 19. This conveyor also receives synthetic plastic fiber which begins as a bale 20 entering into the equipment upon a conveyor 21. A conventional bale breaker and shredder 22, which is schematically shown, shreds the bale into fibers 23 which are deposited as a thin coating over the blanket of wood fibers 13 upon the conveyor 24. By way of example, the coating of synthetic fibers may be on the order of an eighth or a quarter of an inch upon a 2 inch thickness of wood fibers. However, the thicknesses of the fiber deposits may vary considerably, depending upon the nature of the fibers and the fiber ratio of the final specified blend. Preferably, the wood fibers predominate. Optionally, the synthetic fibers 23 may be deposited from conveyor 23 upon conveyor 14 and travel through the dryer 16 with the wood fibers.

The wood fiber and synthetic fiber mixture is carried to a feed conveyor 28 (see FIGS. 1B and 2) where it is raised and dropped into the upper end of a large blending chamber 29. The fiber is gravity dropped downwardly through the chamber, being spread apart and evenly disbursed by a V-shaped spreader 30 located within the chamber.

The dropping fibers accumulate upon blending rolls 31, pass through the nip of the rolls and then, drop down through the lower end 32 of the blending chamber. The blended mixture of fibers 33 land upon a substantially horizontal collection conveyor 34 which conveys the blended fibers to a sloping conveyor 35. Such sloping conveyor, which has a roughened surface that may have cleats or treads or the like for roughening, carries the fibers upwardly to a pair of spiked or rough surface transfer rolls 38 and 39. These rolls transfer the fibers, while further blending them, to a control valve 40 (shown schematically) which may be in the form of a simple movable louvre or plate. The fibers then drop down, in a controlled volume, into a volumetric control chamber 41.

Figure 1B:
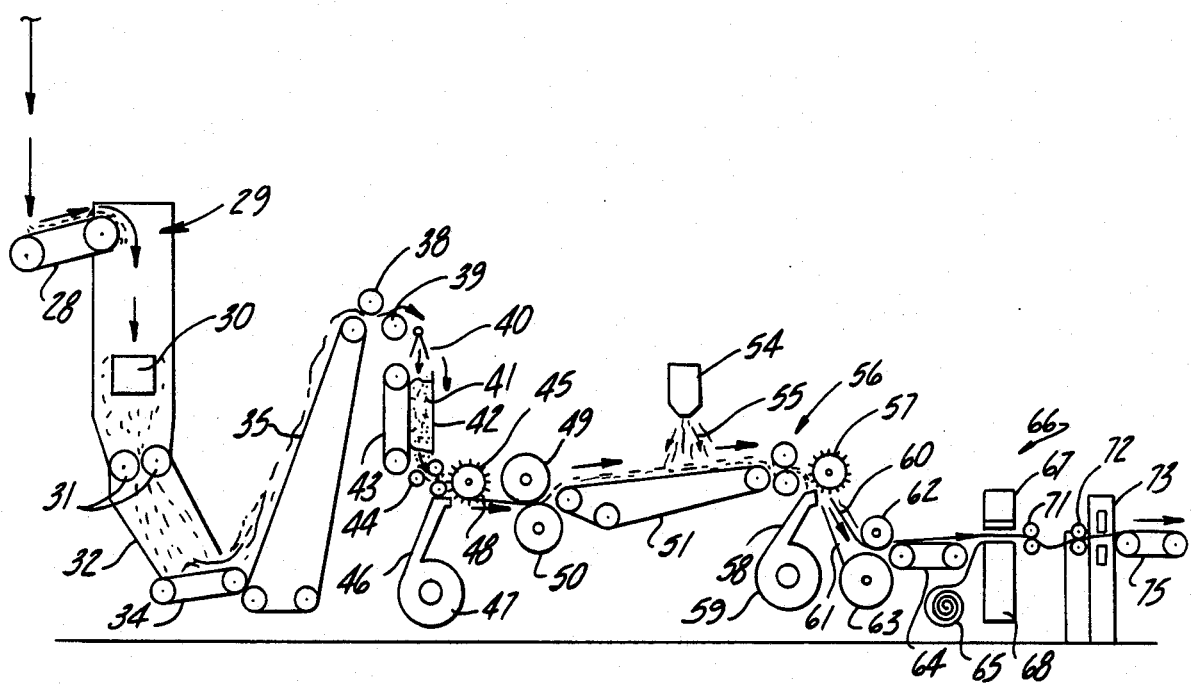
FIG. 1B is a schematic elevational view, continuing the line of equipment from FIG. 1A.
Figure 2:
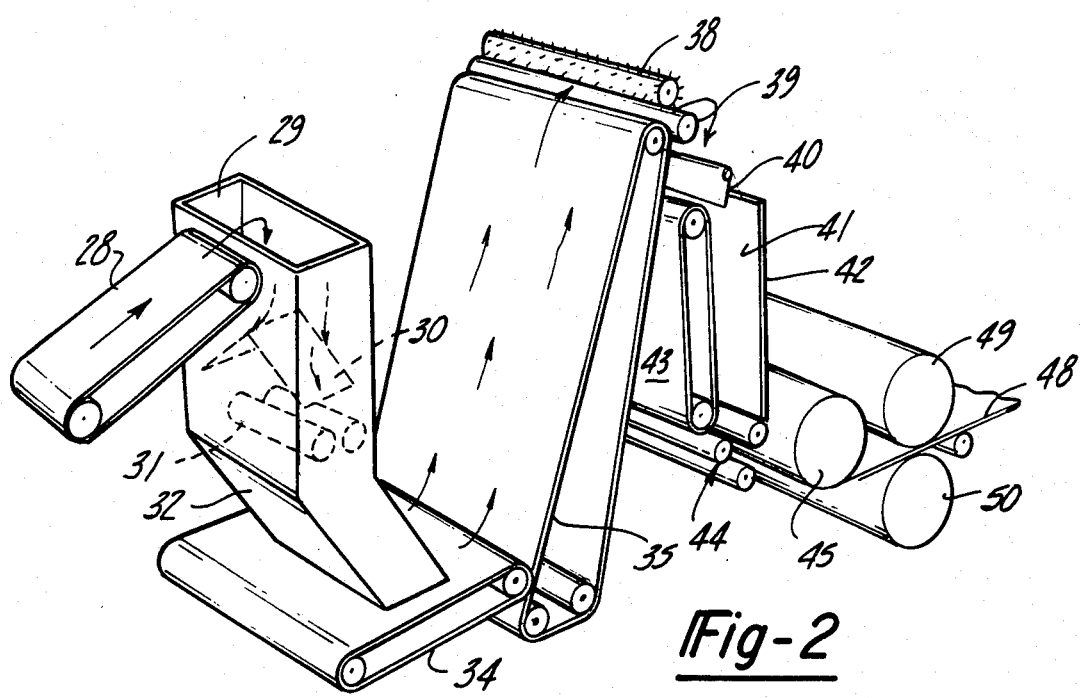
FIG. 2 is a perspective, fragmentary view, showing schematically a portion of the initial blending portion of the equipment.
Figure 3:
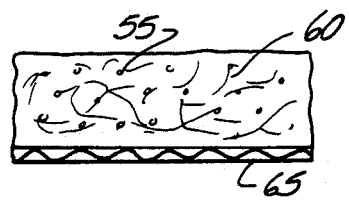
FIG. 3 is an enlarged, fragmentary, cross-sectional view of the web before needling.

In FIG. 1B, the chamber 41 is shown as having one solid wall 42 and an opposing wall 43 formed of a conveyor belt which simultaneously moves the fibers downwardly through the control chamber while containing them within the chamber.

The fibers pass from the bottom of the control chamber into a group of spiked or rough surface transfer rolls 44 which carries them to a picker roll 45. The transfer rolls and picker rolls are conventional in equipment used to form non-woven mats. A conventional transfer roll may have spikes in the form of nail-like projections extending radially outwardly from its surface. Likewise, the picker roll is formed with a rough surface, such as a sawtooth-like surface or spikes or the like.

The fibers are transferred to the surface of the picker roll by the transfer roll spikes, the rough surface of the picker roll and also by means of high velocity air which blows the relatively loose fibers upwardly against the lower surface of the picker roll. The high velocity air is applied by a means of a suitable blower air duct 46 which extends the length of the picker roll. High velocity air for the duct is supplied by a suitable compressor or blower 47 which is schematically shown.

When the fiber is blown and conveyed upon the picker roll, it is further blended and forms an initial web or blanket 48, which is relatively weak. This web or blanket passes between an upper condenser roller 49 and a lower condenser roller 50 which compress the web and directs it to a conveyor 51.

As the web moves with the conveyor 51, it passes beneath a resin hopper 54 which is loaded with a dry powdery, resinous molding material 55, such as a phenolic resin powder. An example of such a material is a phenolformaldehyde novolac type resin containing hexamethylenetetramine for cure purposes supplied in powder form by Polymer Applications, Inc. and identified as PA-60-706 resin.

The resin powder drops downwardly upon the web passing beneath it for dispersion through the web. The resin powder filled web next passes through a group of spiked transfer rollers 56 and is carried around to a second, rough surface picker roll 57, aided by compressed air from an air duct 58. The compressed air is supplied by an air blower 59 which is schematically shown.

A secondary, further blended, web 60 is formed by the second picker roller operation and passes through a duct 61, aided by the flow of compressed air from the air duct 58. This secondary web is passed between an upper condenser roller 62 and a lower condenser roller 63. Preferably, the upper condenser upper condenser roller has a solid or air impervious surface while the lower condenser roller has a perforated surface to permit the escape of the compressed air from the duct 61.

Next, the web is conveyed upon a transfer conveyor 64 to a point where scrim 65 is applied. The scrim may be arranged in a suitable roll and unwound to cover the moving web.

The scrim is made of a thin sheet of non-woven synthetic fiber material, such as nylon, rayon, polypropylene and the like. An example of a commercially available scrim material is spun bonded nylon supplied by Monsanto. The particular kind of scrim material selected depends upon availability, cost, product specifications, etc.

Figure 4:
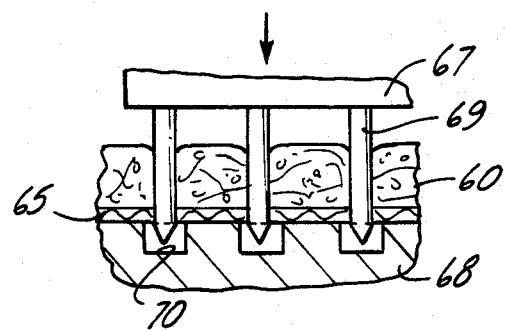
FIG. 4 is an enlarged, fragmentary view, similar to FIG. 3, showing the needling step.

The scrim may be applied either upon the upper surface or the lower surface of the web or even upon both surfaces, if required for the particular finished product. The scrim shown in the drawing is applied to the lower surface of the web and the composite web-scrim material passes into a conventional needling machine 66. This machine has a head 67 and a base 68. Numerous needles 69 (see FIG. 4) are secured to the vertically reciprocating head 67 and enter into sockets 70 formed in the base 68.

The needling operation disrupts and intertwines the fibers that are contacted by and displaced by the needles. Thus, the fibers mechanically interlock with each other and also interlock with the scrim. Consequently, as schematically illustrated in FIG. 5, there appear to be lines of interlocked fibers and an interlocking between the fiber blanket and the scrim sheet which mechanically fastens the material together.

The web moving out of the needling machine 66 is grasped by take-out rolls 71 and passes into a conventional, side trim roller cutter 72 for trimming and straightening the side edges of the web. Then the web proceeds through a blade type cutter 73, or some such suitable conventional cutter, for chopping the web into required lengths. These are removed upon a removal conveyor 75.

Figure 5:
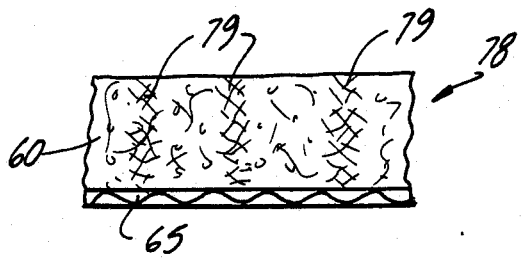
FIG. 5 is a view similar to FIGS. 3 and 4 schematically showing the mechanically interlocked fibers and scrim following needling.

As illustrated in FIG. 5, the finished composite fiber/scrim, mechanically interlocked web 78 has areas of innerlocked fibers 79 which provide the composite web with structural integrity and sufficient strength for handling. The finished web comprises a thoroughly blended or intermixed fiber composition with the powdered resin thoroughly and evenly dispersed through the web. All of the molding powder is uncured and available for molding when the material is placed within a conventional compression mold for heat and pressure molding into a desired shape.

Although the fibers and the handling of the fibers may vary in accordance with the procedure described above, examples of useful web compositions are as follows:

|  | Approximate Range % by Weight | Preferred Approximate % by Weight |
| --- | --- | --- |
| Example I - Composition | | |
| Wood Fiber | 50–80 | 69 |
| Synthetic Fiber | 0.02–10 | 9 |
| Resin (thermoset) | 10–18 | 16 |
| Wax | 0–3 | 2 |
| Water | less than 5 | 4 |
|  |  | 100 |
| Example II - Composition | | |
| Wood Fiber | 60–70 | 66 |
| Synthetic Fiber | 0.02–10 | 8 |
| Resin (thermoset/thermoplastic) | 15–25 | 20 |
| Wax | 0–3 | 2 |
| Water | less than 5 | 4 |
|  |  | 100 |

Examples of typical materials used in the composition are:
Wood fiber: aspen, poplar, pine, etc. e.g., roughly 35–45% retained on 8 mesh screen, with 17% moisture content
Synthetic fiber: nylon, polyester, etc. e.g., Nylon 6 or 66, ½"–1¼" length, 9–15 denier (thickness of fiber)
Thermoset resin: phenolic, epoxy, urethane, etc.
Thermoplastic resin: polyvinyl chloride, polypropylene, etc.
Wax: hydrocarbon, etc., e.g., Fuller WW-0089
Scrim: Monsanto, spun bonded nylon, 0.03 oz. per square yard For certain requirements, the natural wood fibers may be replaced in whole or in part by other natural fibers. Examples of such compositions, using shoddy, i.e., cotton, wool, etc., as follows:

|  | Approximate Range % by Weight | Preferred Approximate % by Weight |
| --- | --- | --- |
| Example III - Composition | | |
| Shoddy (cotton, wool, etc.) | 50–80 | 69 |
| Synthetic | 0.02–10 | 9 |
| Resin (thermoset) | 10–20 | 16 |
| Wax | 0–3 | 2 |
| Water | less than 5 | 4 |
|  |  | 100 |
| Example IV - Composition | | |
| Shoddy | 65–75 | 69 |
| Synthetic Fiber | 0.02–10 | 9 |
| Resin (thermoset/thermoplastic | 14–18 | 16 |
| Wax | 0–3 | 2 |
| Water | less than 5 | 4 |
|  |  | 100 |

Ratio (thermoset/thermoplastic): ½–2/1

In compression molding, a mold release wax is frequently desirable. As set forth in the examples, the wax is in a powder form and in a range of up to about 3% and preferably in the range of roughly 2%.

To dry the wood fibers, which typically come with roughly 16 to 20% moisture content, referring to an aspen type wood such as aspen, yellow poplar and the like, the fibers can be blown through the dryer tube which in a commercially form may be about 180 feet long at a temperature of between about 175°–300° Fahrenheit in less than a minute. This drops the moisture content to between 2–5% and roughly to a preferred 3% moisture by weight.

As can be seen, the wood fibers are deposited, from the broken bales of wood fiber, into a blanket or mat to a depth of roughly 2–3 inches. The synthetic fibers are deposited upon the wood fiber mass to a depth of roughly ¼ inch. As mentioned before, the depths vary depending upon the percentages of the different fibers in the finished blend. These fibers are mixed repeatedly in order to get the high quality desired. That is, the fibers are in the first instance thoroughly blended in the blending chamber 29. Then they are re-blended in passing through the transfer rolls and into the volume control chamber 41. Next, they are again thoroughly re-blended and reconstituted into a fiber web in going through the first transfer roll group 44 and picker roll 45. They are again re-blended, but now containing the powder resin, in the second picker roll 57 and transfer roll group 56. This results in a blend uniformity which in the later compression molding operation provides a uniform density, and molded thickness substrate, and eliminates weak areas in both the cloth-like web and the molded substrate.

The finished web is pliable or readily extensible and thus easily drapable within a relatively deep compression mold having sharp corners, undercut areas and the like. The molded part forms relatively stiff, board-like, structural substrates for use in panels, such as the interior of an automotive vehicle door panel which is covered with an outside plastic shell or skin.

Figure 6:
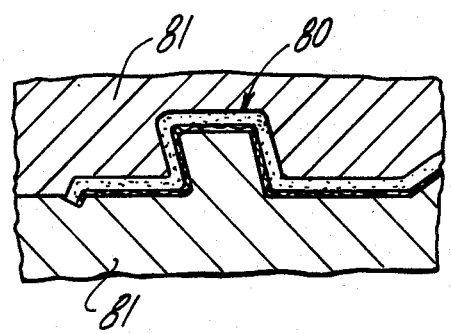
FIG. 6 is a fragmentary cross-sectional view of the molded substrate within the mold cavity.

As illustrated schematically in FIG. 6, the web is draped within the cavity of die half 81. When the opposite die half 82 is registered to close the cavity, the web is molded under heat and pressure to form the relative thin, stiff substrate 80. By way of a typical example, the molding may be in the temperature range of 350–450 degrees F., with pressure at about 350–600 psi and for 30–60 seconds to produce a 0.10 inch thick substrate from a roughly ½ inch thick web.

Having fully described an operative embodiment of this invention, I now claim:

1. A fiber web for use in compression molding a panel structural substrate, comprising:
   a relatively wide and thick mat formed of randomly disposed, non-woven fibers which are thoroughly intermixed;

an uncured molding plastic resin in powder form substantially uniformly disbursed and mixed within the fibers forming the mat;

a thin, non-woven fiber scrim sheet covering at least one of the two opposite faces of the mat;

and said fibers being mechanically interlocked together and to the scrim sheet by needling;

wherein, the web may be cut to pre-determined size and shapes for compression molding, under heat and pressure, within closed cavity molds to form stiff substrates for panels.

2. A construction as defined in claim 1, above, and including said fibers being formed of a thoroughly mixed blend of wood fibers and of synthetic plastic fibers.

3. A web as defined in claim 2, and wherein said wood fibers constitute a predominate portion, e.g., at least one-half of the blend.

4. A web as defined in claim 3, and wherein said wood fibers comprise between about 65–75%, by weight, of the blend, with said synthetic plastic fibers forming the remaining portion of the fiber blend and including said resin being formed of a phenolic resinous material making up between about 14%–18%, by weight, of the web.

5. A web as defined in claim 1, and wherein at least a substantial portion of said fibers are formed of a natural organic material of a substantially different classification than the remaining fibers which are also formed of an organic material.

* * * * *